July 31, 1956 L. J. KROKO Re. 24,190
ELAPSED TIME INDICATOR
Original Filed May 19, 1952
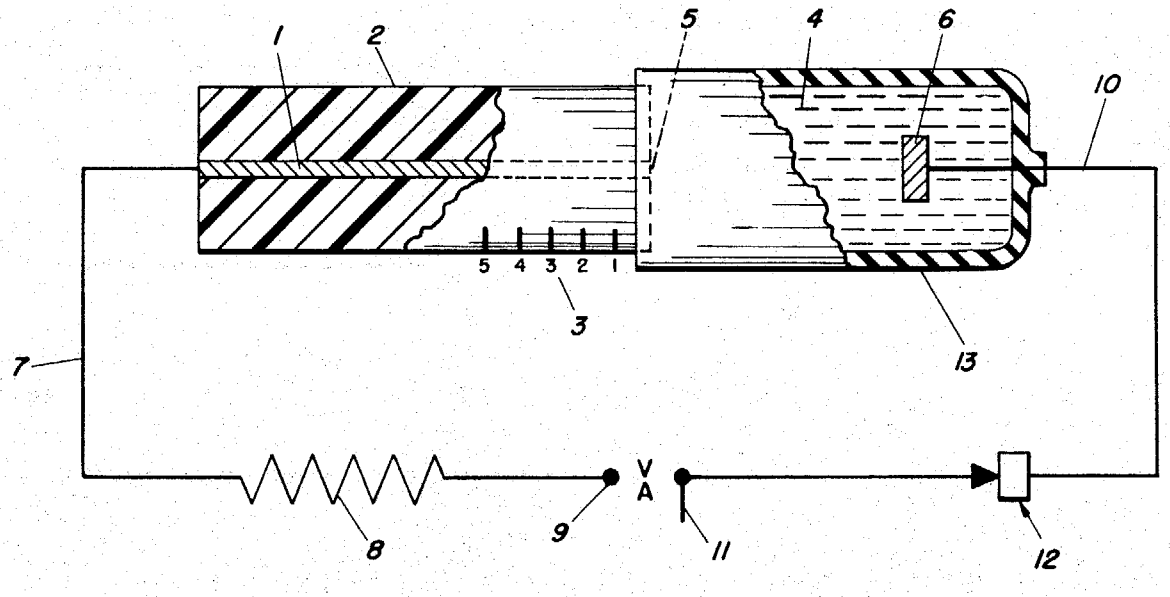
INVENTOR.
LEONARD J. KROKO
BY
Frank H. Harmon
ATTORNEY United States Patent Office Re. 24,190

Reissued July 31, 1956

24,190

ELAPSED TIME INDICATOR

Leonard J. Kroko, Cleveland, Ohio, assignor to Jack & Heintz, Inc., Cleveland, Ohio, a corporation of Delaware Original No. 2,655,634, dated October 13, 1953, Serial No. 288,741, May 19, 1952. Application for reissue February 14, 1955, Serial No. 488,176

4 Claims. (Cl. 324—68)

Matter enclosed in heavy brackets [ ] appears in the original patent but forms no part of this reissue specification; matter printed in italics indicates the additions made by reissue.

This invention relates to general to elapsed time indicators and more particularly to devices for indicating the elapsed time of application of voltage, or voltage operated by, such electrical machines as generators, motors, or the like.

In many such aircraft accessory installations, such as generators, or the like, the elapsed time of aircraft flight is not a true measure of elapsed time of actual operation of the generator, itself.

It is therefore an object of my invention to provide a simple unit for measuring and indicating the actual elapsed time that a voltage has been applied to, or generated by, the electrical macchine and across the terminals of my indicating unit, which I place in circuit with the electrical machine. A further object is to provide such an indicating unit that will measure and indicate the elapsed time through use of an electrolytic cell through which a fixed current is made to flow, and which indication will be proportional to current, resistance and voltage.

A further object is to provide such a unit that will measure and indicate the elapsed time that a voltage has been applied to the terminals of the unit by a visual indication of the amount of the electrode removed by the electrolytical action of an electrolytic cell and deposited on a collector disposed therein.

With the foregoing and other objects in view, the invention resides in the combination of parts and in the details of construction hereinafter set forth in the following specification and appended claims, certain embodiments thereof being illustrated in the accompanying drawing, which is a schematic illustration of the unit constituting my invention, showing the electrode embedded in a clear plastic graduated time scale, and an electrolytic cell and a collector therein and an electrical circuit connected to the electrode and collector and the terminals of the unit.

Referring more particularly to the drawing, I propose to embed a suitable electrode 1 in a transparent cylinder 2 provided at 3 with a graduated scale. The electrode 1 is of uniform size and shape throughout the cylinder 2.

Rigid with the cylinder 2 is an electrolytic cell 4, to the inner contents of which is exposed the bare end 5 of the electrode 1. In the electrolytic cell 4, I propose to mount an anode, or collector 6. The contents of the electrolytic cell may be a solution of silver nitrate. The outer end of the electrode 1 has connected thereto a lead 7 that extends through a resistance 8 to a terminal 9. To the collector 6 is connected a lead 10 that extends to the other terminal 11 of the indicating unit. Such a device as described is suitable for indicating purposes when direct current is used. If alternating current is used it will be necessary to employ a rectifier, such as schematically indicated at 12.

A fixed current flowing through the electrolytic cell 4 causes the electrode 1 to go into the solution and be deposited upon the anode, or collector 6. The electrode 1 is of uniform shape and size throughout its length within the cylinder 2 so that the amount of the electrode 1 that is removed and deposited upon the collector 6 is proportional to the elapsed time during which the current flowed. Inasmuch as the cylinder 2 is transparent, the amount of the electrode that has been thus removed and deposited on the collector is indicated and may be easily determined by visual reference to the time scale 3 showing the removed and remaining portions of the electrode within the transparent cylinder 2.

I claim:

1. In an electrical unit for measuring and indicating the elapsed time during which a fixed voltage has been applied to said unit, a transparent cylinder, a solid electrode embedded therein, an electrolytic cell coaxially rigid with said cylinder, the electrolytic contents of which are engaged with one end of said electrode, a collector embedded in said electrolytic cell, a pair of terminals, one having a lead to the other end of said electrode, and the other terminal having a lead connected to said collector, a resistance in the lead between one terminal and said electrode, said cylinder having a graduated scale to indicate the amount of said electrode being deposited upon said collector when voltage is applied to said terminals and integrated in units of time elapse during which said voltage has been applied to said terminals.

2. In an electrical unit for measuring and indicating the elapsed time during which a fixed voltage has been applied to said unit, a housing *and* a solid electrode embedded therein, an electrolytic cell coaxial with said housing, the electrolytic contents of which are engaged with one end of said electrode, *a collector in said cell, a pair of terminals one of which is connected to one end of the electrode,* and the other terminal having a lead connected to said collector, said housing having a graduated scale to indicate the amount of said electrode being deposited upon said collector when voltage is applied to said terminals.

3. In an electrical unit for measuring and indicating the elapsed time during which a fixed voltage has been applied to said unit, a transparent cylinder a solid electrode embedded therein, an electrolytic cell rigid with said cylinder, the electrolytic contents of which are engaged with one end of said electrode, a collector embedded in said electrolytic cell a pair of terminals, one having a lead to the other end of said electrode, and the other terminal having a lead connected to said collector, said cylinder having a graduated scale to indicate the amount of said electrode being deposited upon said collector when voltage is applied to said terminals and integrated in units of time elapse during which said voltage has been applied to said terminals.

4. In an electrical unit for measuring and indicating the elapsed time during which a fixed voltage has been applied to said unit, a housing and a solid electrode embedded therein, an electrolytic cell coaxially rigid with said housing, the electrolytic contents of which are engaged with one end of said electrode, a collector embedded in said electrolytic cell, a pair of terminals, one having a lead to the other end of said electrode, and the other terminal having a lead connected to said collector, a resistance in the lead between one terminal and said electrode for establishing said fixed voltage, said cylinder having a graduated scale to indicate the amount of said electrode being deposited upon said collector when voltage is applied to said terminals and integrated in units of time elapse during which said voltage has been applied to said terminals.

References Cited in the file of this patent or the original patent

UNITED STATES PATENTS 1,171,279 Tuttle ---------- Feb. 8, 1916